Nov. 18, 1924.                                              1,516,351
                        M. I. SEILER
             COMBINATION SCREW DIE AND COLLET
                   Filed Aug. 2, 1921
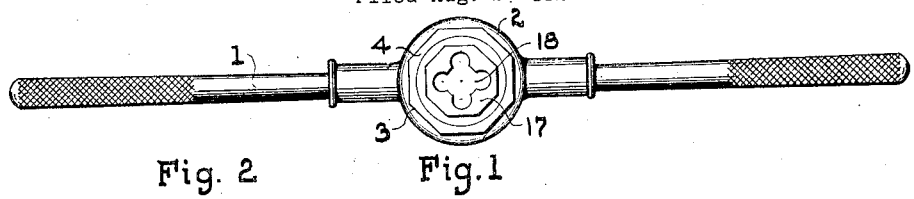
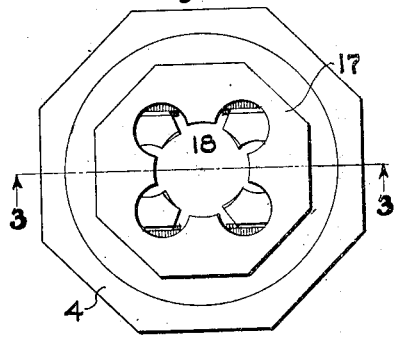
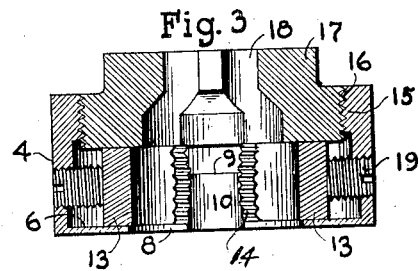
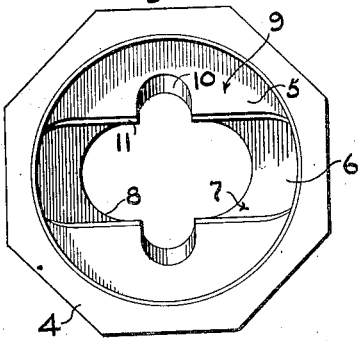
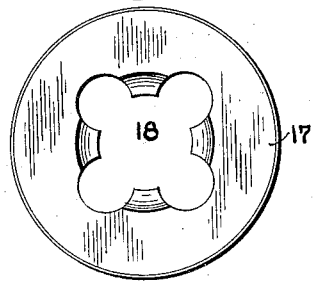
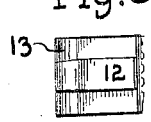
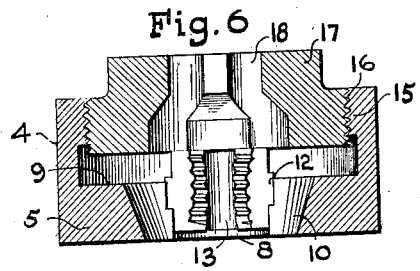
Michael I. Seiler
INVENTOR
BY  *C. G. Siggers*
ATTORNEY
WITNESSES Patented Nov. 18, 1924.

1,516,351

UNITED STATES PATENT OFFICE.

MICHAEL I. SEILER, OF MILLERSBURG, PENNSYLVANIA, ASSIGNOR TO KEYSTONE REAMER & TOOL CO., OF MILLERSBURG, PENNSYLVANIA, A CORPORATION OF PENNSYLVANIA.

COMBINATION SCREW DIE AND COLLET.

Application filed August 2, 1921. Serial No. 489,316.

*To all whom it may concern:*

Be it known that I, MICHAEL I. SEILER, a citizen of the United States, residing at Millersburg, in the county of Dauphin and State of Pennsylvania, have invented a new and useful Combination Screw Die and Collet, of which the following is a specification.

This invention has reference to a combination screw die and collet, and its object is to provide a screw cutting device wherein two matching dies are employed, so that they may be reversed as desired, for cutting bottoming screw threads or screw threads of the vanishing type.

The invention is directed to the production of a collet having an exterior non-circular contour which may be engaged by an ordinary wrench, or may be manipulated by a die stock having a non-circular seat for the collet, whereby slipping cannot occur and special clamping means is not necessary.

The invention has the advantage of simplicity and ease of operation, and the implement may be held without turning in its holder or stock, and this is accomplished without strain on any of the parts. The invention includes a specially made two-piece thread-cutting die, having a square or similar rib so located as to permit the die to be reversed in the collet whereby either side of the die may be used.

The most useful exterior shape of the collet is octagonal, which allows the collet to be turned by an ordinary hand wrench, or to be held in a stock provided with an octagonal seat, or to be manipulated, especially for cleaning or clearing more or less damaged threads, by the simple expedient of turning the collet and die by the hand, without employing either a wrench or stock. Difficulty is sometimes encountered with ordinary round collets, in the slipping of the collets in the stock, despite the presence of clamp screws. The octagonal seat with the octagonal collet fully obviates this trouble.

The collet is provided with a bottom guide holding the die in place and against which the two-part die is clamped by the top guide screwed into the collet, and bearing firmly upon the die, the top guide having an octagonal projection or nut, also serving for the application of a wrench to seat it and to provide a guide for the work.

The invention will be best understood from a consideration of the following detailed description, taken in connection with the accompanying drawing forming part of this specification, with the understanding, however, that the invention is not confined to any strict conformity with the showing of the drawing, but may be changed and modified, so long as such changes and modifications mark no material departure from the salient features of the invention, as expressed in the appended claims.

In the drawing:—

Fig. 1 is a plan view of a die stock having an octagonal passage therethrough for receiving and holding an octagonal collet;

Fig. 2 is a plan view of an octagonal collet with a two-part thread-cutting die contained therein;

Fig. 3 is a section on the line 3—3 of Fig. 2;

Fig. 4 is a plan view of the collet with the top or cover member and the die removed;

Fig. 5 is an inverted plan view of the top guide of the collet;

Fig. 6 is a section of the collet and parts carried thereby with the line of the section at right angles to the plane of Fig. 3;

Fig. 7 is a perspective view of one member of the two-part die;

Fig. 8 is a side view of the same.

Referring to the drawing, there is shown in Fig. 1 a die stock 1 which, in general form, corresponds to a standard die stock, but is modified from the standard die stock in being provided with a central collar 2, with a central passage 3, of octagonal form. It is to be understood that such shape may be changed to some other non-circular contour without departing from the invention, but for the sake of simplicity of description the contour will hereinafter be referred to as octagonal. Since the die stock 1 corresponds, with the exception of the shape of the opening through it, with ordinary die stocks, no special description thereof is needed.

Adapted to the octagonal passage 3 of the die stock is a collet 4 of exterior octagonal shape, the collet being shown separately in Fig. 4. The collet has an interior cavity 5 having diametrically opposite alined channels 6, each terminating in a bottom wall 7, and together defining a through opening 8 serving as a bottom work guide. The cavity 5 on each side of the channels 6 forms ledges 9, with intermediate cut-outs 10 arranged in alinement on opposite sides of the channels 6.

The opposite sides of each channel 6 are provided with longitudinal grooves 11 to receive oppositely located ribs 12 on the sides of die blocks 13, suitably shaped to move lengthwise in the channels 6 in which the blocks 13 are seated. The ribs 12 extend lengthwise of the sides, as shown in Fig. 8, and are arranged equidistant from the top and bottom. The blocks 13 constitute a pair of screw-cutting dies, having screw threads 14 which are so shaped that at one end of a die the threads act as bottoming threads and at the other end, produce more or less vanishing cuts, thereby allowing either bottoming or vanishing threads to be formed according as to whether one face or the other of the die blocks is uppermost. Since the dies 13 may follow the usual practice in screw cutting tools, no further description thereof is given.

The collet is provided at the end remote from the ledges 9 with an over-hanging threaded flange 15, with screw threads 16, to the depth of the flange. Fitted to the screw threads 16, is a nut or top guide 17 (Fig. 5), provided with a work-guiding opening 18 axially therethrough, and in line with the work guide at the bottom of the collet.

In order to adjust the closeness or ease of the thread produced by the die, the blocks 13 are engaged by set screws 19 (Fig. 3), carried by the collet and limiting the relative position of the die blocks 13, with respect to the work.

The two-piece reversible die and collet is a complete article as a whole, with all parts coacting and capable of use, with or without a die stock, for the die stock 1 may be replaced by an ordinary wrench because of the octagonal contour of the collet, with such collet useful by itself for light work, and then requiring no holder or stock for its manipulation. This is of importance, for oftentimes the strength of the human hand is ample for clearing up or smoothing out damaged threads without the need of securing the dies in the holder. Moreover, it is not necessary, even where considerable power is needed to cut the threads, to especially fasten the collet in the stock, or to even use a stock, for an ordinary wrench will answer the same purpose, thereby effecting a material saving in time.

By arranging the ribs 12, equidistant of the top and bottom faces of each die 13, the latter may be reversed in position, since they are identical in shape.

What is claimed is:

A combination screw die and collet for use with a die stock or independently thereof with an ordinary wrench, comprising a collet of non-circular exterior having an interior cavity with diametrically opposite alined channels, each terminating in a bottom wall and together defining a through opening serving as a bottom work guide, said cavity on each side of the channels forming ledges with intermediate cut-outs arranged in alinement on opposite sides of the channels, said channels having their opposite sides provided with longitudinal grooves, die blocks fitted in said channels and supported on the bottom walls thereof, and having oppositely located external ribs on the sides thereof, said ribs engaging said grooves and arranged equidistant from the top and bottom and thereby made reversible, said collet having at the end remote from the ledges an overhanging threaded flange, a top guide having an axial work guiding opening and threaded to engage said flange, and bearing on top of the die block, and set screws engaging the die blocks, the latter being held by the bottom walls of said channels and said top guide.

In testimony, that I claim the foregoing as my own, I have hereto affixed my signature.

MICHAEL I. SEILER.